US009178783B1

(12) United States Patent
Sun et al.

(10) Patent No.: US 9,178,783 B1
(45) Date of Patent: Nov. 3, 2015

(54) MEASURING NETWORK PERFORMANCE USING INTER-PACKET GAP METRIC

(71) Applicant: Cisco Technology, Inc., San Jose, CA (US)

(72) Inventors: Yan Sun, Pleasanton, CA (US); Vivian Xu, San Jose, CA (US); Sharad Ahlawat, San Jose, CA (US); Kuntal Daftary, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 147 days.

(21) Appl. No.: 14/133,398

(22) Filed: Dec. 18, 2013

(51) Int. Cl.
*H04L 12/26* (2006.01)
*H04L 12/28* (2006.01)
*G06F 15/173* (2006.01)

(52) U.S. Cl.
CPC ..................... *H04L 43/045* (2013.01)

(58) Field of Classification Search
CPC ........... H04L 47/00; H04L 47/10–47/11; H04L 47/12; H04L 47/14; H04L 47/20–47/22; H04L 47/24; H04L 47/28; H04L 47/32; H04L 47/34; H04L 47/41; H04L 47/50; H04L 47/56; H04L 47/127; H04L 47/215; H04L 47/263; H04L 47/283; H04L 47/521; H04L 47/527–47/528; H04L 47/621; H04L 47/624; H04L 47/627; H04L 47/805; H04L 47/808; H04L 47/2408; H04L 47/2425; H04L 47/2441; H04L 47/6215; H04L 47/6285; H04L 2012/5636; H04L 2012/5651; H04L 1/0071; H04L 12/2602; H04L 12/5602; H04L 12/5693; H04L 41/0896; H04L 41/142; H04L 41/5009; H04L 43/00; H04L 43/06; H04L 43/0852; H04L 43/0894; H04L 43/087; H04L 43/12; H04L 43/16; H04L 43/50; H04L 43/106; H04L 49/00; H04L 49/90; H04L 49/9057; H04L 63/1408; H04L 65/80; H04L 67/325; H04L 69/22; H04W 28/22; H04W 72/12
USPC .......... 370/229–240, 412–418; 709/223–226, 709/230–245, 248–253
See application file for complete search history.

(56) References Cited

U.S. PATENT DOCUMENTS

| | | | | |
|---|---|---|---|---|
| 6,044,060 A * | 3/2000 | Jones | ........................ | 370/230.1 |
| 6,198,743 B1 * | 3/2001 | Giroux et al. | .............. | 370/235.1 |
| 6,839,751 B1 * | 1/2005 | Dietz et al. | .................... | 709/224 |
| 6,922,392 B2 * | 7/2005 | Matsufuru | ................. | 370/230.1 |
| 8,031,611 B2 * | 10/2011 | Yoon et al. | ................. | 370/235.1 |
| 8,467,296 B2 * | 6/2013 | Figueira | ..................... | 370/235.1 |

* cited by examiner

*Primary Examiner* — Tri H Phan
(74) *Attorney, Agent, or Firm* — Hickman Palermo Becker Bingham LLP (57) ABSTRACT

Techniques for measuring network performance using the inter-packet gap metric are described. According to one approach, a computer-implemented method comprises a plurality of inter-packet gap buckets, along with their associated counts and inter-packet gap value ranges, being created and stored at a network node. Two or more network packets are received at a network node as a part of at least one unidirectional flow. For each successively received packet, the network node then determines the inter-packet gap value. Next, the network node compares the inter-packet gap value with the different discrete inter-packet gap value ranges that are associated with the stored inter-packet gap buckets. If the inter-packet gap value is included in an inter-packet gap value range associated with a particular inter-packet gap bucket then the that bucket is updated. The network node then exports the inter-packet gap metric data to a computer system.

16 Claims, 6 Drawing Sheets

MEASURING NETWORK PERFORMANCE USING INTER-PACKET GAP METRIC

TECHNICAL FIELD

The present disclosure generally relates to computer-implemented techniques for addressing network performance visibility, and relates more particularly to measuring packet performance data at nodes in a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In packet switching networks a packet flow or traffic flow is a sequence of packets between two or more internetworking elements or network nodes such as routers, switches, or computer systems. Improving network performance visibility by collecting metrics related to traffic flows is important to both service providers and customers to manage the network and monitor application performance. For example, service providers may need to determine if there is network degradation or congestion at a particular network node. As another example, customers may need to know, if there is Quality of Service ("QoS") throttling or queuing at a particular network node or may require metrics regarding an application's performance in order to quickly detect potential problems before they have a significant impact.

One approach involves measuring jitter. For any pair of consecutive network packets, jitter is the mean deviation of the difference in packet spacing at a receiving network node compared to the spacing at a corresponding sending network node. For example, for real time transport protocol ("RTP"), if a sending network node sent packet i at the time $S_i$, and a receiving network node received the packet at time $R_i$, then the jitter value is calculated as:

$$J_i=|(R_{i+1}-R_i)-(S_{i+1}-S_i)|$$

Currently RTP jitter is supported in most internetworking nodes according to Request for Comments ("RFC") 3550 of the Internet Engineering Task Force. Collecting RTP jitter metric data contributes to network overhead because it requires every network packet to be time stamped and requires including the time stamps in the RTP header by the sending network node.

Similarly, another approach is to measure the jitter for packets sent using the User Datagram Protocol ("UDP"). UDP jitter is supported by certain commercial products of Cisco Systems, Inc., San Jose, Calif. UDP jitter metric requires sending active probe packets to obtain the measurements and requires software, typically at a management station, to initiate sending the packets and to receive and interpret responses.

The existing methods of collecting metrics relating to packet flow are inadequate as they involve significant overhead, can only be implemented for certain network protocols, are difficult to deploy, and place a burden on the network nodes that forward the traffic.

DESCRIPTION OF EXAMPLE EMBODIMENTS

Techniques for measuring network performance using inter-packet gap values are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For convenience references will be made to various communication elements such as "messages" and "packets" of different layers of the Open System Interconnection (OSI) networking model. However, mention of a particular type of communication element in conjunction with a feature is not intended to limit the feature to only one layer of the OSI model. Thus, a feature discussed as applicable to one layer of the OSI model may also be applicable to other layers of the OSI model as well.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Embodiments are described herein according to the following outline:

1.0 Overview
    2.0 Overview of Example Embodiment
    3.0 Process for Calculating Inter-packet Gap Value
    3.1 Example of Calculating Inter-packet Gap Value
    3.2 Process for Determining If an Inter-packet Gap Value Is in the Inter-packet Gap Buckets
    4.0 Graphical Representation
    5.0 Hardware Overview
    6.0 Extensions and Alternatives

1.0 Overview

Techniques for measuring network performance using inter-packet gap values are described. The following computer-implemented steps are performed in accordance with one embodiment. A plurality of inter-packet gap buckets, with associated count values and inter-packet gap value ranges, are created and stored at a network node. Two or more network packets are received at a network node as a part of at least one unidirectional flow. Each of the network packets arrives at the network node at its own particular arrival time. For each successively received packet, the network node determines an inter-packet gap value by calculating a difference between a particular arrival time of one packet and a particular arrival time of a next consecutive packet. The network node compares the inter-packet gap value with two or more different discrete inter-packet gap value ranges that are associated with the stored inter-packet gap buckets. If the inter-packet gap value is in an inter-packet gap value range associated with a particular inter-packet gap bucket, then the count value associated with that bucket is updated. These steps may be repeated for each successively retrieved packet from the same flow or different flows.

In other embodiments, the invention encompasses a computer apparatus and a non-transitory computer-readable medium configured to carry out the foregoing steps.

2.0 Overview of Example Embodiment

Figure 1:
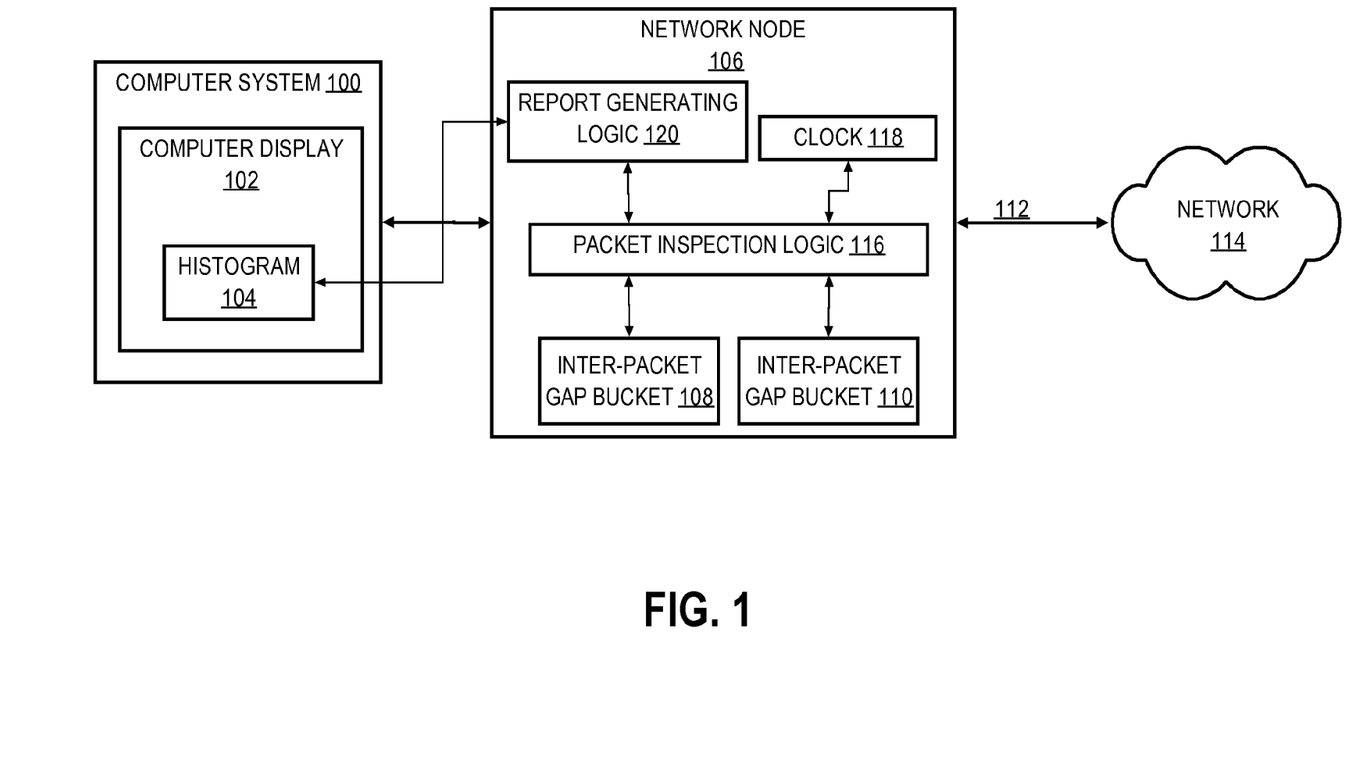
FIG. 1 illustrates an example computer-networking environment with which an embodiment may be implemented.

FIG. 1 illustrates an example computer-networking environment with which an embodiment may be implemented.

In FIG. 1, a computer system 100 is communicatively coupled to a network node 106 acting as a measurement point that receives a flow of network packets 112 from a network 114.

In an embodiment, the computer system 100 comprises a computing device that is configured as a management station, and may be structured as the example computing device described herein in the "Hardware Overview" section. In another embodiment, the computer system 100 may be a specialized computing device. For example, the computer system 100 may be video infrastructure or audio infrastructure device that is optimized for services such as video conferencing, digital telephony, and/or CISCO TELEPRESENCE. In still other embodiments, the computer system 100 represents network end stations such as laptop computers, server computers, mobile computers, tablet computers, or smartphones, or may represent software components executing on one or more computing systems.

In one embodiment, the computer system 100 is a computing device or software component providing a user interface, on a computer display 102, which allows users to request, search, and view information stored by the measuring point 106. In one embodiment, the computer system 100 provides a textual and/or visual presentation of the metric data to the users to aid in detecting problems and making decisions regarding the configuration of the networks and/or applications using the networks. In one embodiment, the visual presentation of the inter-packet gap metric data is in the form of a histogram 104. Particular techniques for developing data as a basis for presentation of histogram 104 are further described herein.

The network node 106 collects, stores, and, depending upon the embodiment, aggregates the inter-packet gap metric data gathered from receiving network packets from a network 114. In an embodiment, network node 106 comprises packet inspection logic 116 coupled to a plurality of inter-packet gap buckets 108, 110, a clock 118, and report generating logic 120. Network node 106 also comprises interfaces to the network 114 to receive a traffic flow 112 and to computer system 100.

In an embodiment, when the network node 106 receives a network packet of traffic flow 114, the clock 118 generates a particular arrival time for the network packet. The arrival time is communicated to the packet inspection logic 116. The packet inspection logic 116 is configured to determine an inter packet gap value for the network packet and to determine if the inter-packet gap value is in an inter-packet gap value range associated with one of the inter-packet gap buckets 108, 110. The packet inspection logic 116 updates the appropriate inter-packet gap bucket 108, 110, for example, by incrementing a count associated with the applicable bucket 108, 110.

In some embodiments, count values for buckets 108, 110 are maintained in storage at network node 106 and provided to computer system 100 in reply to a poll, request, or other message. Additionally or alternatively, network node 106 may be configured to export the inter-packet gap metric data to the computer system 100 automatically and/or in reply to a poll, request, or other message from computer system 100.

Although only a particular number elements is depicted in FIG. 1, a practical environment may have many more of each depicted element. In addition, the network layout of the computer-networking environment depicted in FIG. 1 may change from embodiment to embodiment. For example, the computer system 100 may be communicatively coupled to the measurement point 106 directly or indirectly through one or more networks, for example a service provider network, or other internetworking elements. Similarly, the measurement point 106 may be connected to the network 114 through one or more intermediary networks, for example a customer network, or other internetworking elements. Furthermore, as another example, the computer-networking environment may contain multiple instances of the network node 106, each collecting inter-packet gap metric data from a different region of the service provider network 114 or different subsets of internetworking elements. For example, network node 106 may represent one of a large number of routers in a service provider network or other network. The use of customer networks and a service provider network are not required in all embodiments and some embodiments may be implemented in a LAN or in an enterprise-networking environment that is entirely owned or operated by a party without a separate service provider or customers.

In an embodiment, network 114 represents any combination of one or more local networks, wide area networks, or internetworks coupled using wired or wireless links deployed using terrestrial or satellite connections. Data exchanged over the network, may be transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols may be used at each of the underlying sub-networks. In some embodiments, the network may represent one or more interconnected inter-networks, such as the public Internet.

In an embodiment, the traffic flow 112 identified by the network node 106 represents sequences of packets adhering to a protocol for transferring messages through the network. Depending on the embodiment, the protocol may belong to any number of communication layers, such as the transport layer, application layer, session layer, etc. In some embodiments, the protocol may be a connection-oriented protocol, such as Transmission Control Protocol (TCP), or a connectionless protocol, such as User Datagram Protocol (UDP).

In an embodiment, the network node 106 is an internetworking element, such as a bridge, a switch, router, proxy server, gateway or other computing device configured for forwarding packets through the network. In some embodiments, the network node 106 may be communicatively coupled with a data storage center or data warehouse for archiving inter-packet gap metric data collected from devices in the network 114.

In one embodiment, the network node 106 reports inter-packet gap metric data to the computer system 100 at specified intervals of time. For example, an export process may be configured to execute every minute. In another embodiment, the network node 106 reports inter-packet gap metric data to the computer system 100, in response to particular events, such as discovering a new traffic flow, receiving a threshold number of new packets over a particular flow, detecting that a flow has ended, etc. In another embodiment, the computer system 100 may be used to compare the inter-packet gap metric data collected at two or more network nodes to determine if there is network degradation, congestion, or QOS throttling or queuing at a particular network node. In yet another embodiment, the computer system 100 periodically polls the network node 106 to request traffic flow information. In some embodiments, network node 106 is configured to only send data that has been collected since the last export. For example, the network node 106 can be configured to report out to the computer system 100 every five minutes the metric data collected over the monitored flows for the last five minutes. Furthermore, in some embodiments, network node 106 can be configured to send a particular subset of the collected metric data or metric data belonging to a particular subset of flows. In some embodiment, the export process is limited by a minimum export window. For example, at a particular network node 106, the smallest window for recording and storing the inter-packet gap metric data is two minutes, that is data cannot be exported by the network node 106 more than once every two minutes.

3.0 Process Flow for Calculating Inter-Packet Gap Value

Figure 2:
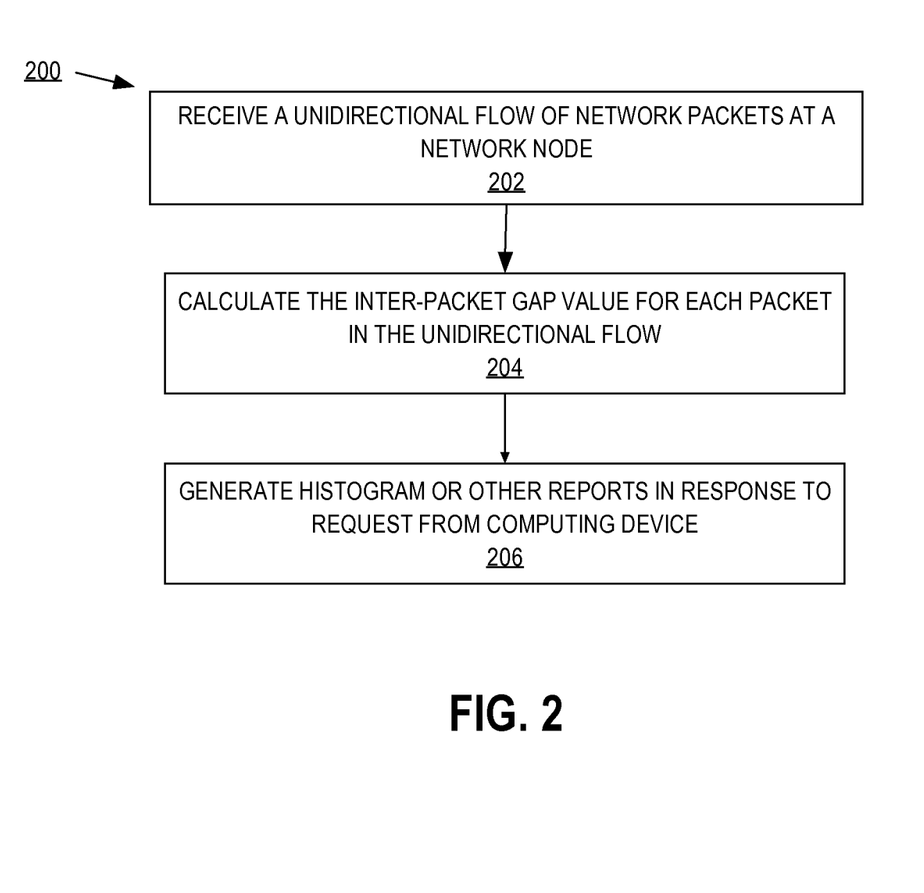
FIG. 2 illustrates a process for calculating an inter-packet gap value for a network packet in an embodiment.

FIG. 2 illustrates a process for calculating the inter-packet gap value for a network packet in an embodiment. For purposes of illustrating clear examples, the process flow depicted in FIG. 2 is described in connection with the example network node 106, the network flow 112, and the computer system 100 of FIG. 1. However, a same or substantially similar process can be utilized at any other network node in the networks of FIG. 1 or other implementations.

Referring now to FIG. 2, at block 202, the process receives a unidirectional flow of network packets at a network node. For example, the network node 106 receives network packets from a unidirectional flow 112. In this context, a flow may be defined as two or more packets that comprise the same five-tuple of values in the Internet Protocol header, namely source IP address, destination IP address, source port value, destination port value, and protocol value. In an embodiment, the network packets may have travelled through several hops before reaching the network node 106. In embodiments with networks with multiple measurement points, the same network packets may be received at some or all of these measurement points. In one embodiment, after the network packets are received, the network node 106 utilizes the clock 118 to record the arrival times of each of the network packets. In one embodiment, network node 106 may assign a starting value of zero to the arrival time of the first network packet and measure the arrival time of each subsequent packet from that starting value. In some embodiments, the network node 106 may use the local time at the clock 118 to determine arrival times of each of the network packets. In one embodiment, the arrival times of the network packets are measured in milliseconds ("ms").

Embodiments may be used to measure inter-packet gap values for a plurality of packets of a unidirectional flow as specified above. Additionally or alternatively, inter-packet gap values for two unidirectional flows that flow in generally opposite directions may be determined separately at different network nodes and associated with one another in data storage for purposes of comparison, analysis, and/or fault diagnosis. For example, if network nodes A and B are endpoints in a video call, voice-over-IP call or data communication, it may be useful for node A to compute inter-packet gap values for a flow defined as unidirectional from B to A, and for node B to compute inter-packet gap values for a flow defined as unidirectional from A to B and relating to the same call, client-server transaction, or other subject matter. Values for the flows that are computed separately at nodes A and B could be exchanged using a suitable messaging protocol, stored in storage that is accessible to both nodes A and B, or communicated among one another in a different manner.

At block 204, the process calculates an inter-packet gap value for each packet in the unilateral flow. For example, the network node 106 calculates an inter-packet gap value for each of the network packets. In an embodiment, the network node 106 communicates the arrival times of the network packets to the packet inspection logic 116, which calculates the inter-packet gap value for each packet. In one embodiment, the network node 106, stores the inter-packet gap value for each packet in the unidirectional flow. In an embodiment, the inter-packet gap value for a particular network packet is calculated as the difference between the arrival time of a packet arriving consecutively after the particular packet and the arrival time of the particular packet. For example, if a particular packet is the $i^{th}$ packet to arrive and its arrival time is $R_i$, the inter-packet gap value $IG_i$ for the packet I is defined as:

$$IG_i = R_{i+1} - R_i$$

The calculation may be repeated for each network packet in the unidirectional flow 112. In one embodiment, the inter-packet gap value for each network packet is calculated as the network packets arrive at the network node 106. In another embodiment, the arrival time of each of the network packets is stored and the inter-packet gap value for each network packet is calculated only when a request is received from the computer system 100. Particular techniques with which the network node 106 may store the inter-packet gap values are further described herein.

At block 206, the process generates a histogram or other reports in response to a request from a computing device. For example, the inter-packet gap value is utilized by the network node 106 to generate a graphical representation or other report in response to a request from the computer system 100. In one embodiment, the graphical representation is a histogram. Techniques for generating a histogram are described further in other sections herein.

3.1 Example of Calculating Inter-Packet Gap

Figure 6:
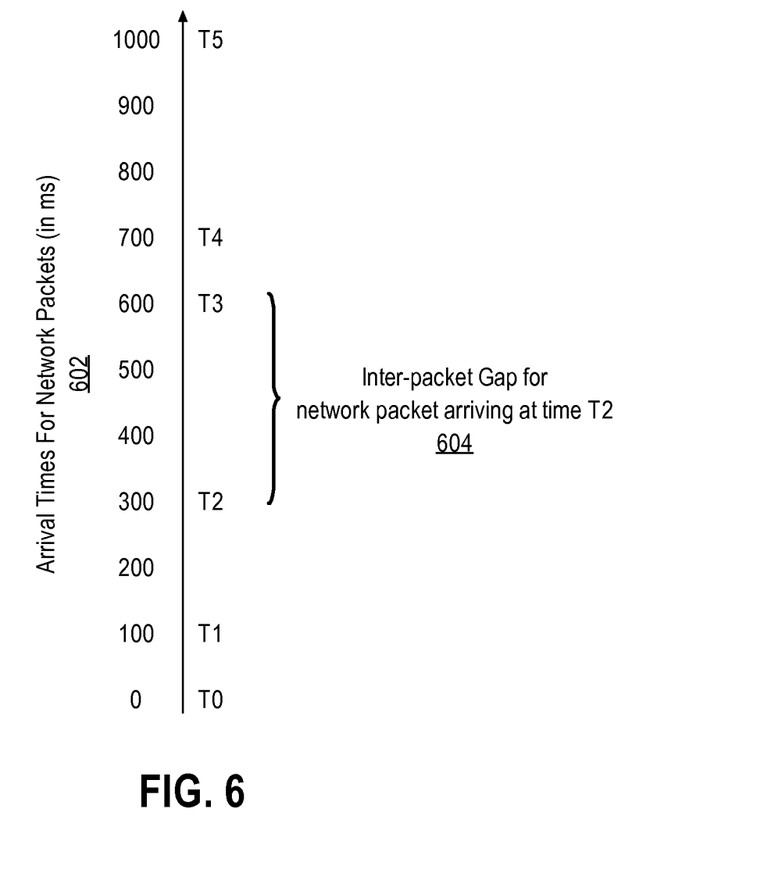
FIG. 6 illustrates an example timeline that illustrates the inter-packet gap value for different network packets in an embodiment.

FIG. 6 is a timeline that illustrates inter-packet gap values for different network packets in an embodiment. FIG. 6 comprises a timeline 602 specifying example times of arrival at a network node for hypothetical packets, measured in milliseconds, from a start time that is arbitrarily labeled "0" to a point 1 second later that is labeled "1000." Labels $T_1$, $T_2$ and others represent times of arrival at the network node of particular network packets. An example inter-packet gap 604 is illustrated for hypothetical packets arriving at $T_2$, $T_3$.

For example, $T_2$ is the arrival time at a particular network node for the third network packet among a series of network packets; $T_3$ is the arrival time for the fourth network packet and so on. If $T_2$ is equal to 300 ms and $T_4$ is equal to 600 ms, then the inter-packet gap for packet $T_2$ is calculated as:

$$IG_2 = R_{2+1} - R_2 = R_3 - R_2 = 600 - 300 = 300 \text{ ms}$$

Similarly, the inter-packet gap for $T_1$ and $T_2$ is 200 ms. In some networks, the arrival times of consecutive network packets vary due to network congestion or degradation, application configuration, or QOS throttling. Consequently, differences in inter-packet gap times may be observed over time at the same network node for different flows or for different packets in the same flow. In an embodiment, the packet inspection logic 116 of network node 106 is configured to determine inter-packet gap values in the manner shown in FIG. 6 for all packets of a particular flow, for all packets of two or more flows, or for all packets of all flows. Configuration values, established using appropriate commands of a command-line interface (CLI), instructions from computer system 100, or other mechanisms may be used to instruct the network node 106 whether to initiate computing inter-packet gap values in the manner shown in FIG. 6 for all packets of a particular flow, for all packets of two or more flows, or for all packets of all flows.

Figure 3:
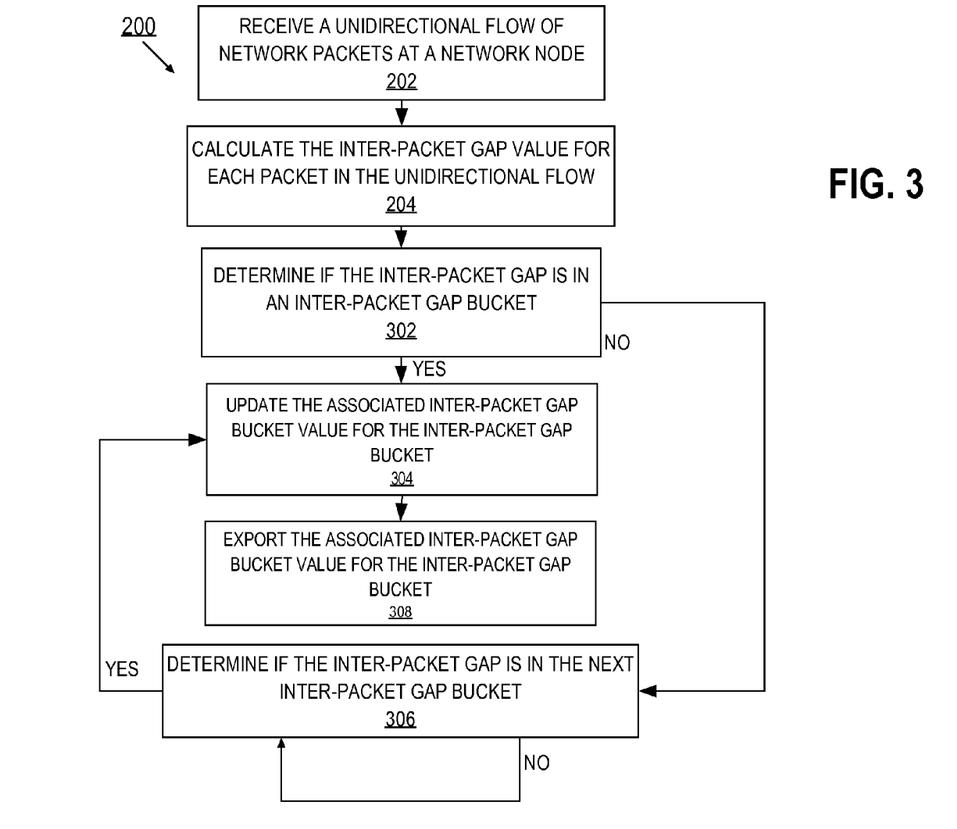
FIG. 3 illustrates a process for determining if the inter-packet gap value is in specified inter-packet gap buckets in an embodiment.

3.2 Example of Determining if an Inter-Packet Gap Value is in an Inter-Packet Gap Bucket FIG. 3 illustrates a process for determining if an inter-packet gap is in an inter-packet gap bucket in an embodiment. For illustrating clear examples, the process flow depicted in FIG. 2 is described in connection with the example network node 106, the network flow 112, and computer system 100 of FIG. 1. However, a same or substantially similar process can be utilized at any other network node in the networks of FIG. 1 or other implementations.

At block 202, the process receives a unidirectional flow of network packets at a network node. For example, the network node 106 receives network packets as described above in connection with FIG. 2.

At block 204, the process calculates an inter-packet gap for each packet in the unidirectional flow. For example, the network node 106 calculates the inter-packet gap value for one or more of the network packets as described above in connection with FIG. 2.

At block 302, the process determines if the inter-packet gap value is in an inter-packet gap bucket. For example, the network node 106 utilizes the packet inspection logic 116 to determine if the inter-packet gap value computed at block 204 is within a range of inter-packet gap values that is associated with one of the inter-packet gap buckets 108, 110. In one embodiment, the inter-packet gap buckets 108, 110 are created and stored or otherwise established in computer memory of the network node 106 at a point before initiating the process of FIG. 3, and are associated with a plurality of different discrete inter-packet gap value ranges and an associated count. The associated count of a particular inter-packet gap bucket is the number of inter-packet gap values within the range of that inter-packet gap bucket.

In an embodiment, the inter-packet gap value ranges are measured in milliseconds, but other embodiments may use other units of measurement. In some embodiments, the computer system 100 and/or the network node 106 can configure the number of inter-packet gap buckets. For example, the network node 106 of FIG. 1 is configured with two inter-packet gap buckets 108, 110 for purposes of illustrating a clear example, but other embodiments may have any number of such buckets.

In an embodiment, the computer system 100 and/or the network node 106 can configure the discrete range of inter-packet gap values that is represented in each of the buckets 108, 110. For example, the computer system 100 may configure a first inter-packet gap bucket 108 so that it is updated when the inter-packet gap values of the network packets received by network node 106 are greater than or equal to 0 ms and less than 100 ms. Similarly, the second bucket 110 may be configured so that it is updated only inter-packet gap values of the network packets received by 106 are greater than or equal to 100 ms and less than 200 ms.

In an embodiment, the computer system 100 or the network node 106 can configure the inter-packet gap buckets to measure acceptable and unacceptable metric data. For example, the computer system 100 may configure inter-packet gap bucket 108 so that it is updated when the inter-packet gap values of the network packets received by network node 106 are in an acceptable range, for example, greater than or equal to 0 ms and less than 250 ms. Similarly, the bucket 110 may be configured so that it is updated when inter-packet gap values of the network packets received by network node 106 are in an unacceptable range, for example, greater than or equal to 251 ms and less than 500 ms. The definition of an acceptable range and/or an unacceptable range may be specified in configuration data that is provided to the packet inspection logic 116, and may vary based upon the nature or role of the network node 106, or based upon other values such as the IP address, port, or protocol values of a flow. In one embodiment, a stored table, mapping, set of rules, or other policy may associate particular IP addresses, port values, or protocol values of flows with acceptable range values, and the packet inspection logic 116 may be configured to increment the count of a bucket 108, 110 only when the inter-packet gap values measured at the network node 106 are within or exceed the acceptable range value as specified in an entry in the stored table, mapping, set of rules, or other policy that corresponds to the particular IP addresses, port values, or protocol values of flows associated with those inter-packet gap values.

In one embodiment, at block 302 the packet inspection logic 116 tests whether the inter-packet gap value is within the range of inter-packet gap values associated with a particular inter-packet gap bucket. For example, if the range of inter-packet gap bucket 108 is 0 ms to 200 ms, the packet inspection logic 116 tests whether the inter-packet gap value is greater than or equal to 0 and less than 200. If the packet inspection logic 116 determines that the inter-packet gap is in the range associated with the first inter-packet gap bucket that is checked, or another bucket that is checked as further described herein, then control transfers to block 304. If the packet inspection logic 116 determines that the inter-packet gap is not in the range associated with the first inter-packet gap bucket that is checked, then control transfers to block 306.

At block 306, the packet inspection logic tests the next inter-packet gap bucket as described above to determine if the inter-packet gap value is within the range associated with that one of the inter-packet gap buckets. "Next," in this context, refers to another bucket that is associated with a different range. If the inter-packet gap value is not in the range associated with the next inter-packet gap bucket that is checked, then the packet inspection logic 116 keeps checking the next inter-packet gap bucket.

In some embodiments, if the inter-packet gap value for a network packet is not found in any of ranges associated with the inter-packet gap buckets then the value is discarded. In some embodiments, if the inter-packet gap value for a network packet is not found in any of the ranges associated with the inter-packet gap buckets then the value is assumed to be in the inter-packet gap bucket with the numerically highest starting and ending values of its associated range of inter-packet gap values. For example, for a particular network packet, assume that the inter-packet gap value is 500 ms and there are two inter-packet buckets. The first bucket is configured to be updated if the inter-packet gap value is greater than or equal to 0 ms and less than 200 ms and the second bucket is configured to be updated if the inter-packet gap value is greater than or equal to 201 ms and less than 400 ms. In this case the packet inspection logic 116 determines that, for the particular network packet, the inter-packet gap value is within the range associated with the second bucket.

At block 304, the process updates the inter-packet gap bucket that matched the inter-packet gap bucket value of the packet. For example, the packet inspection logic 116 updates a count associated with the inter-packet gap bucket that matched the inter-packet gap value as tested at block 302. In some embodiments, updating the inter-packet gap bucket involves increasing the count associated with the inter-packet gap bucket by one. In one embodiment, updating the inter-packet gap bucket involves storing the inter-packet gap value in the inter-packet gap bucket or, depending upon the embodiment, a data structure associated with the inter-packet gap bucket. For example, the inter-packet gap values are stored in a table where the rows represent each of the inter-packet gap buckets and each cell in the row stores an inter-packet gap value associated with one of the network packets. Thus, in some embodiments, buckets 108, 110 and any other buckets do not have associated count values. In an embodiment, updating the inter-packet gap bucket involves both increasing the count and storing the inter-packet gap value.

At block 308, the process optionally exports the associated inter-packet gap bucket value for the inter-packet gap bucket. For example, the report generating logic 120 exports the inter-packet gap values to the computer system 100. In some embodiments, the values are exported only on request from the computer system 100. In some embodiments, the values that are exported include the inter-packet gap values and the associated counts and/or, depending upon the embodiment, the inter-packet gap values that the packet inspection logic 116 determined should be stored in those buckets.

The process of FIG. 3 may be repeated any number of times for successive packets of a flow, or for different flows. The process of FIG. 3 may be initiated upon demand, in response to various conditions, or may be continuously active. The process of FIG. 3 may be configured as a callable process so that completion of block 304, 308 results in returning control to a calling process.

4.0 Graphical Representation

Figure 5:
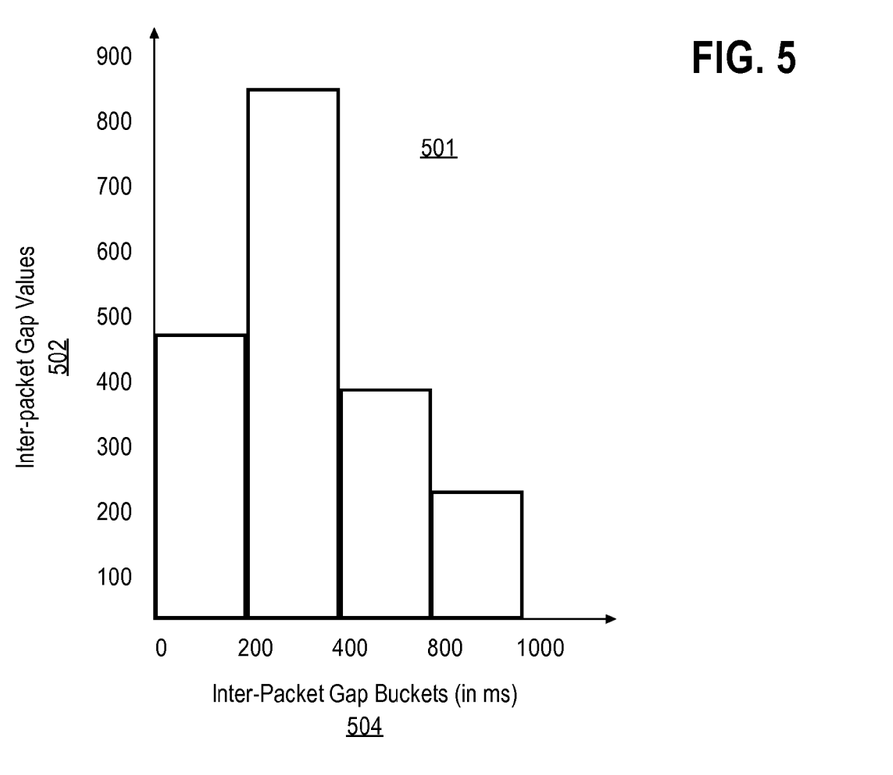
FIG. 5 illustrates an example histogram that shows a frequency distribution for the counts of the inter-packet gap values associated with each of the inter-packet gap buckets in an embodiment.

FIG. 5 is an example histogram that illustrates a frequency distribution for the counts of the inter-packet gaps associated with each of the inter-packet gap buckets in an embodiment. For the purpose of illustrating a clear example, the histogram 501 depicted in FIG. 5 is discussed in connection with the example network node 106, the network flow 112, and computer system 100 of FIG. 1. However, a same or substantially similar histogram can be generated for inter-packet gap metric data gathered at any other network node in the networks of FIG. 1 or other implementations.

In an embodiment, computer system 100 may use inter-packet gap value data to generate visual representations. Additionally or alternatively, network node 106 may create data that can be rendered into visual representations, or graphic files containing visual representations. Thus, as between network node and computer system 100, the particular functional unit that generates visual representations of the data or generates data usable for rendering visual representations is not critical.

In one embodiment, the visual representation is a histogram comprising an x-axis, a y-axis, and a plurality of graphical bars. The x-axis depicts each of the inter-packet gap buckets, the y-axis depicts the frequency of the associated counts, and each bar graphically depicts the frequency of one of the associated counts. For example in FIG. 5, in histogram 501 the x-axis 504 illustrates four inter-packet gap buckets associated with ranges of 0-200 (ms), 201-400 (ms), 401-600 (ms), and 601-800 (ms). The y-axis 502 comprises a scale indicating associated counts of packets in buckets associated with the ranges indicated in the x-axis, for example 480, 850, 390, 210 packets. Each of the bars depicts one of the associated counts, for example the 0-200 (ms) bucket has a count value of 480 indicating that 480 network packets, out of the total number of network packets for which the inter-packet gap value was calculated, had values between 0 and 200 ms.

In some embodiments, the graphical representation may be a density histogram with an x-axis, a y-axis, and a plurality of graphical bars. In this embodiment, the x-axis depicts each of the inter-packet gap buckets, the y-axis depicts a scale to measure normalized associated counts, and each bar graphically depicts the frequency of one of the normalized counts. For example, in one embodiment, the counts associated with the inter-packet gap buckets may be normalized by dividing the count for each of the inter-packet buckets by a product of a the sum of the total number of network packets received at measurement point 106 for generating inter-packet gap values and the difference in the ending value and starting value of the inter-packet gap bucket.

In some embodiments, the graphical representation may be a cluster graph with an x-axis, a y-axis, and a plurality of dots. In this embodiment, the x-axis depicts each of the inter-packet gap buckets, the y-axis depicts a scale for inter-packet gap values, and each dot indicates the inter-packet gap value of a network packet received at network node 106. For example, in one embodiment, the dot clusters can indicate if there is a better distribution of the range of values associated with inter-packet gap buckets.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, network devices or any other device that incorporates hard-wired and/or program logic to implement the techniques.

Figure 4:
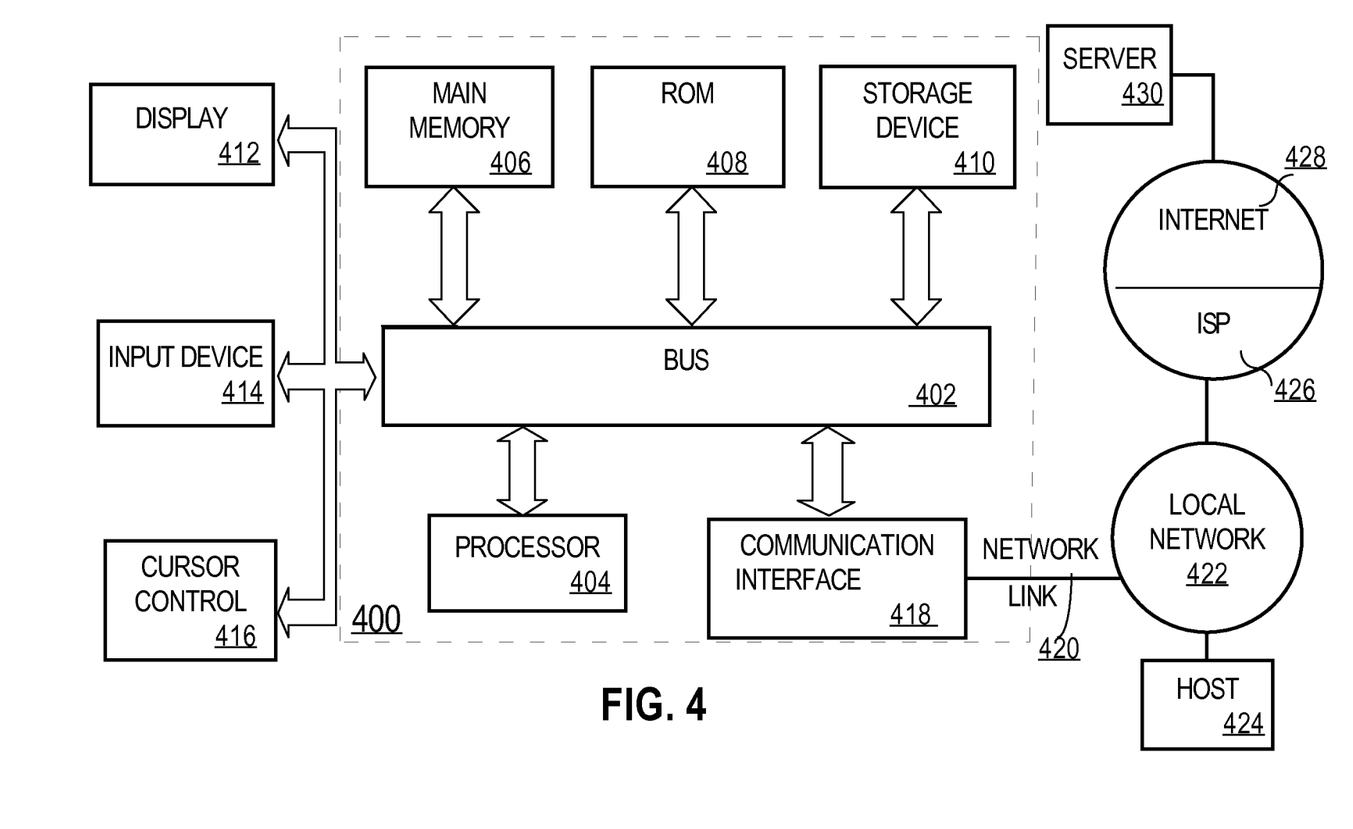
FIG. 4 illustrates a block diagram for a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420, and communication interface 418. In the Internet example, a server 430 might transmit a requested code for an application program through Internet 428, ISP 426, local network 422, and communication interface 418.

The received code may be executed by processor 404 as it is received, and/or stored in storage device 410, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   using an internetworking element, creating and storing a plurality of inter-packet gap buckets each configured to store a count that is associated with one of a plurality of different discrete inter-packet gap value ranges;
   using the internetworking element, receiving at least a unidirectional flow comprising two or more network packets each received at a different particular arrival time;
   determining, using the internetworking element, an inter-packet gap value for each of the two or more network packets as a difference between the particular arrival time of one of the two or more network packets and the particular arrival time of a next consecutive network packet among the two or more network packets;
   updating of one of the inter-packet gap buckets that is associated with a particular different discrete inter-packet gap value range that includes the inter-packet gap value;
   repeating the receiving, determining and updating for successively received packets of the same flow or different flows.

2. The computer-implemented method of claim 1, comprising:
   updating of the one of the inter-packet gap buckets by incrementing the count of the one of the inter-packet gap buckets that is associated with a particular different discrete inter-packet gap value range that includes the inter-packet gap value;
   repeating the receiving, determining and updating by incrementing for successively received packets of the same flow or different flows
   exporting the counts of each of the inter-packet gap buckets.

3. The computer-implemented method of claim 2, comprising displaying a graphical representation of each of the inter-packet gap bucket values.

4. The method of claim 3 comprising generating a histogram as the graphical representation wherein, the histogram comprises of a first axis, a second axis, and a plurality of graphical bars, and wherein the first axis depicts each of the inter-packet gap buckets, the second axis depicts a scale to measure the counts, and each bar graphically depicts one of the counts.

5. The method of claim 3, comprising generating a density histogram as the graphical representation, wherein the density histogram comprises of a first axis, a second axis, and a plurality of graphical bars and wherein the first axis depicts each of the inter-packet gap buckets, the second axis depicts a scale to measure a normalized counts, and each bar graphically depicts one of the normalized counts.

6. The method of claim 1, comprising creating and storing a plurality of inter-packet gap buckets each configured to store a count that is associated with one of a plurality of different inter-packet gap value ranges that are associated with unacceptable network performance metrics.

7. The method of claim 1, comprising receiving configuration data specifying a number of buckets, and creating and storing the plurality of inter-packet gap buckets according to the number of buckets.

8. The method of claim 1, comprising receiving configuration data specifying a plurality of the particular different discrete inter-packet gap value ranges, and creating and storing the plurality of inter-packet gap buckets according to the plurality of the particular different discrete inter-packet gap value ranges that are received in the configuration data.

9. A non-transitory computer-readable storage medium storing one or more sequences of instructions, which instructions, when executed by one or more processors, cause the one or more processors to perform steps comprising:
   using an internetworking element, creating and storing a plurality of inter-packet gap buckets each configured to store a count that is associated with one of a plurality of different discrete inter-packet gap value ranges;
   using the internetworking element, receiving at least a unidirectional flow comprising two or more network packets each received at a different particular arrival time;
   determining, using the internetworking element, an inter-packet gap value for each of the two or more network packets as a difference between the particular arrival time of one of the two or more network packets and the particular arrival time of a next consecutive network packet among the two or more network packets;
   updating of one of the inter-packet gap buckets that is associated with a particular different discrete inter-packet gap value range that includes the inter-packet gap value;
   repeating the receiving, determining and updating for successively received packets of the same flow or different flows.

10. The non-transitory computer-readable storage medium of claim 9, comprising:
    updating of the one of the inter-packet gap buckets by incrementing the count of the one of the inter-packet gap buckets that is associated with a particular different discrete inter-packet gap value range that includes the inter-packet gap value;
    repeating the receiving, determining and updating by incrementing for successively received packets of the same flow or different flows
    exporting the counts of each of the inter-packet gap buckets.

11. The non-transitory computer-readable storage medium of claim 10, comprising displaying a graphical representation of each of the inter-packet gap bucket values.

12. The non-transitory computer-readable storage medium of claim 11, comprising generating a histogram as the graphical representation wherein, the histogram comprises of a first axis, a second axis, and a plurality of graphical bars, and wherein the first axis depicts each of the inter-packet gap buckets, the second axis depicts a scale to measure the counts, and each bar graphically depicts one of the counts.

13. The non-transitory computer-readable storage medium of claim 11, comprising generating a density histogram as the graphical representation, wherein the density histogram comprises of a first axis, a second axis, and a plurality of graphical bars and wherein the first axis depicts each of the inter-packet gap buckets, the second axis depicts a scale to measure a normalized counts, and each bar graphically depicts one of the normalized counts.

14. The non-transitory computer-readable storage medium of claim 9, comprising creating and storing a plurality of inter-packet gap buckets each configured to store a count that is associated with one of a plurality of different inter-packet gap value ranges that are associated with unacceptable network performance metrics.

15. The non-transitory computer-readable storage medium of claim 9, comprising receiving configuration data specifying a number of buckets, and creating and storing the plurality of inter-packet gap buckets according to the number of buckets.

16. The non-transitory computer-readable storage medium of claim 9, comprising receiving configuration data specifying a plurality of the particular different discrete inter-packet gap value ranges, and creating and storing the plurality of inter-packet gap buckets according to the plurality of the particular different discrete inter-packet gap value ranges that are received in the configuration data.

\* \* \* \* \*